US011469656B2

(12) United States Patent
Zu et al.

(10) Patent No.: US 11,469,656 B2
(45) Date of Patent: Oct. 11, 2022

(54) LINEAR VIBRATING MOTOR

(71) Applicant: GOERTEK INC., Weifang (CN)

(72) Inventors: Fenglei Zu, Weifang (CN); Chunfa Liu, Weifang (CN)

(73) Assignee: GOERTEK INC., Shandong (CN)

( * ) Notice: Subject to any disclaimer, the term of this patent is extended or adjusted under 35 U.S.C. 154(b) by 1044 days.

(21) Appl. No.: 16/075,221

(22) PCT Filed: Jun. 3, 2016

(86) PCT No.: PCT/CN2016/084794
§ 371 (c)(1),
(2) Date: Aug. 3, 2018

(87) PCT Pub. No.: WO2017/133152
PCT Pub. Date: Aug. 10, 2017

(65) Prior Publication Data
US 2019/0044425 A1 Feb. 7, 2019

(30) Foreign Application Priority Data

Feb. 5, 2016 (CN) .......................... 201610082045.7

(51) Int. Cl.
*H02K 33/02* (2006.01)
*H04M 19/04* (2006.01)
(Continued)

(52) U.S. Cl.
CPC ............. *H02K 33/02* (2013.01); *H02K 33/18* (2013.01); *H04M 19/047* (2013.01); *H04M 1/026* (2013.01); *H04M 1/03* (2013.01)

(58) Field of Classification Search
CPC ........ H02K 33/02; H02K 33/04; H02K 33/06; H02K 33/08; H02K 33/10; H02K 33/16; H02K 33/18; H02K 35/02; H04M 19/047
(Continued)

(56) References Cited

U.S. PATENT DOCUMENTS 3,585,424 A * 6/1971 Neel ....................... G04B 18/00
310/25
2012/0181886 A1* 7/2012 Osada ....................... H02K 3/14
310/71
(Continued)

FOREIGN PATENT DOCUMENTS

CN 104660106 A * 5/2015 ............. H02K 33/16
CN 105262310 A 1/2016
(Continued)

OTHER PUBLICATIONS

Heim (DE 4222292 A1) English Translation (Year: 1993).*
(Continued)

*Primary Examiner* — Tulsidas C Patel
*Assistant Examiner* — Robert E Mates
(74) *Attorney, Agent, or Firm* — Saliwanchik, Lloyd & Eisenschenk

(57) ABSTRACT

The present application provides a linear vibrating motor comprising a housing, a vibrator and a stator that is secured to the housing and is parallel to the vibrator, the vibrator comprises a mass block and a vibrating block embedded in the middle of the mass block; the vibrating block includes a permanent magnet; push-pull structures adjoin two ends of the vibrating block respectively; the push-pull structure comprises a push-pull magnet embedded in the mass block and a push-pull coil secured to the housing; an interaction force for enhancing a magnetic field is generated between the push-pull magnet and an adjacent permanent magnet; and the push-pull coil generates a push-pull force in a horizontal direction together with the push-pull magnet after being electrified to provide an initial driving force for a reciprocating motion of the vibrator in a direction that is parallel to a plane where the stator is located.

11 Claims, 10 Drawing Sheets

(51) Int. Cl.
   *H02K 33/18* (2006.01)
   *H04M 1/02* (2006.01)
   *H04M 1/03* (2006.01)

(58) Field of Classification Search
   USPC .......................................................... 310/15
   See application file for complete search history.

(56) References Cited

U.S. PATENT DOCUMENTS

| | | | | |
|---|---|---|---|---|
| 2015/0123507 | A1* | 5/2015 | Degtyar | H02K 1/2793 |
| | | | | 310/156.37 |
| 2016/0226363 | A1* | 8/2016 | Mao | H02K 33/16 |
| 2018/0351443 | A1* | 12/2018 | Liu | H02K 33/14 |

FOREIGN PATENT DOCUMENTS

| | | | | |
|---|---|---|---|---|
| CN | 105281527 A | 1/2016 | | |
| CN | 105281528 A | 1/2016 | | |
| CN | 105281529 A | 1/2016 | | |
| CN | 105305764 A | 2/2016 | | |
| CN | 105356710 A | 2/2016 | | |
| CN | 105356711 A | 2/2016 | | |
| CN | 105356712 A | 2/2016 | | |
| CN | 105529896 A | 4/2016 | | |
| CN | 105529898 A | 4/2016 | | |
| CN | 205178826 U | 4/2016 | | |
| CN | 205178827 U | 4/2016 | | |
| CN | 205178828 U | 4/2016 | | |
| CN | 205283365 U | 6/2016 | | |
| CN | 205283366 U | 6/2016 | | |
| CN | 205283367 U | 6/2016 | | |
| CN | 205283368 U | 6/2016 | | |
| CN | 205283369 U | 6/2016 | | |
| CN | 205430022 U | 8/2016 | | |
| CN | 205490071 U | 8/2016 | | |
| CN | 205490072 U | 8/2016 | | |
| CN | 205566063 U | 9/2016 | | |
| CN | 205566064 U | 9/2016 | | |
| CN | 205583980 U | 9/2016 | | |
| CN | 205583985 U | 9/2016 | | |
| CN | 205595987 U | 9/2016 | | |
| CN | 205595988 U | 9/2016 | | |
| CN | 205595997 U | 9/2016 | | |
| CN | 205622462 U | 10/2016 | | |
| DE | 4222292 A1 * | 2/1993 | | H02K 3/12 |
| EP | 2608373 A1 | 6/2013 | | |
| JP | 11155274 A * | 6/1999 | | |
| JP | 2008220020 A * | 9/2008 | | |
| WO | 2014148656 A1 | 9/2014 | | |
| WO | WO-2015140959 A1 * | 9/2015 | | H02K 35/02 |

OTHER PUBLICATIONS

Nomura (WO 2015140959 A1) English Translation (Year: 2015).*
Moritake (JP 11155274 A) English Translation (Year: 1999).*
Mukaide (JP 2008220020 A) English Translation (Year: 2008).*

* cited by examiner

LINEAR VIBRATING MOTOR

CROSS REFERENCE TO RELATED APPLICATIONS

This application is a National Stage of International Application No. PCT/CN2016/084794, filed on Jun. 3, 2016, which claims priority to Chinese Patent Application No. 201610082045.7, filed on Feb. 5, 2016, both of which are hereby incorporated by reference in their entireties.

FIELD OF THE INVENTION

The present application relates to the technical field of consumer electronics, and in particular to a linear vibrating motor applied to portable consumer electronics.

BACKGROUND OF THE INVENTION

With development of the communication technology, portable electronic products, such as a mobile phone, a hand-held game machine and a hand-held multimedia entertainment device, have entered people's life. In these portable electronic products, micro vibrating motors are generally used for system feedback, such as call notification of the mobile phone and vibration feedback of the game machine. However, as the electronic products are becoming lighter and thinner, various internal components thereof need to adapt to this development trend, and the micro vibrating motors are no exception.

A conventional micro vibrating motor generally comprises an upper cover, a lower cover that forms a vibration space together with the upper cover, a vibrator (including a balancing weight and a permanent magnet) that performs linear reciprocating vibration in the vibration space, an elastic support member which is connected to the upper cover and enables the vibrator to perform the reciprocating vibration, and a coil that is a certain distance below the vibrator.

In the micro vibrating motor of the above structure, a force that drives the vibrator to vibrate all comes from a magnetic field force between the vibrator and the coil. As this magnetic field force is limited, a vibration sense of the vibrator is relatively smaller. Besides, due to a position change of the vibrator relative to the coil in a vibration process, the magnitude of the force upon the vibrator is changed. The response speed of linear vibration is non-uniform. Consequently, vibration of the vibrator is subject to a non-linear change, which impacts the balance of vibration sense of electronic products.

SUMMARY OF THE INVENTION

In view of the above problem, an objective of the present application is to provide a linear vibrating motor. A push-pull structure is utilized to provide vibration of a vibrator with an initial driving force, such that the vibrator is pushed to perform a reciprocating motion in a direction that is parallel to a plane where a stator is located. A designed position of a push-pull structure in the prior art is changed not only to realize reuse of a magnetic field and to increase a push-pull force but also to reserve a bigger design space for elastic support members at two ends of a mass block.

The linear vibrator motor provided by the present application comprises a housing, a vibrator and a stator. The stator is secured to the housing and is parallel to the vibrator. The vibrator comprises a mass block and a vibrating block embedded in the middle of the mass block. The vibrating block comprises a permanent magnet. Push-pull structures adjoin two ends of the vibrating block respectively. The push-pull structure comprises a push-pull magnet embedded in the mass block and a push-pull coil secured to the housing. An interaction force for enhancing a magnetic field is generated between the push-pull magnet and an adjacent permanent magnet. The push-pull coil generates a push-pull force in a horizontal direction together with the push-pull magnet after being electrified to provide the push-pull force for a reciprocating motion of the vibrator in a direction that is parallel to a plane where the stator is located.

Optionally, the stator comprises a magnetic induction block that is opposite to the vibrator and secured to the housing. The magnetic induction block is subject to a magnetic field force that is the same as and/or opposite to a vibration direction of the vibrator.

Optionally, at least one pair of push-pull magnet securing grooves is symmetrically provided in the mass block. Each push-pull magnet securing groove accommodates two push-pull magnets distributed in a vertical direction and a magnetic induction yoke located between the two push-pull magnets.

Optionally, the push-pull magnet is magnetized in the vertical direction. The permanent magnet is magnetized in a horizontal direction. Adjacent ends of the permanent magnet and the adjacent push-pull magnet have opposite magnetic poles.

Optionally, four pairs of push-pull magnet securing grooves are symmetrically provided in the mass black. Each push-pull magnet securing groove accommodates two push-pull magnets that are distributed in the vertical direction. Four push-pull coils of which the positions correspond to those of the push-pull magnets are secured to the housing. The push-pull coils are located at the upper sides and the lower sides of the corresponding push-pull magnets. A winding direction of the push-pull coil is perpendicular to a magnetization direction of the push-pull magnet.

Optionally, a magnetic liquid is filled between the push-pull coil and the adjacent push-pull magnet.

Optionally, the push-pull coil is an irregularly-wound coil. The winding quantity of the push-pull coil in the position, with concentrated magnetic induction lines, of the push-pull magnet is increased.

Optionally, the push-pull coil is a superimposedly wound coil or an interleavingly wound coil.

Optionally, when the vibrator is in a balanced state, a resultant force of the magnetic field force is zero. When the magnetic induction block is displaced relative to the vibrator in the vibration direction of the vibrator under the action of a push-pull force that is generated by the push-pull structure, the direction of the resultant force of the magnetic field force is the same as that of relative displacement. The magnitude of the resultant force of the magnetic field force and the relative displacement are in direct proportion.

Optionally, a make-way structure that corresponds to the push-pull coil and the magnetic induction block is disposed in the middle of the mass block. A groove for accommodating the vibrating block is provided in the mass block. The vibrating block is secured in the groove by means of gluing.

The linear vibrating motor according to the present application jumps out of a conventional motor design concept that a driving force is only provided by a vibrator and a magnetic field force of a coil. The push-pull structure is utilized to provide vibration of the vibrator with the initial driving force so as to push the vibrator to perform the reciprocating motion in the direction that is parallel to the plane where the stator is located. In addition, the disposing mode that the push-pull structure is adjacent to the vibrating block is employed in the present application, such that not only may reuse of the magnetic field generated by the permanent magnet of the vibrator be realized and may the vibration sense of the linear vibrating motor be enhanced, but also more space may be reserved for the design of the elastic support member.

To realize the foregoing and related objectives, one or more aspects of the present application include features that will be described in detail below and particularly pointed out in the claims. The following description and accompanying drawings illustrate some exemplary aspects of the present application in detail. However, these aspects merely indicate a few of various modes in which the principle of the present application may be used. Besides, the present application is intended to include all of these aspects and their equivalents.

BRIEF DESCRIPTION OF THE DRAWINGS

By reference to contents of the following description and claims in conjunction with the accompanying drawings, and with a more comprehensive understanding of the present application, other objectives and results of the present application will become clearer and easier to understand. The accompanying drawings are described as below:

The same reference numbers in all the accompanying drawings indicate similar or corresponding features or functions.

DETAILED DESCRIPTION OF THE EMBODIMENTS

In the following description, for the purposes of explanation, numerous specific details are set forth in order to provide a thorough understanding of one or more embodiments. However, it will be apparent that these embodiments may also be practiced without these specific details. In other instances, well-known structures and devices are shown in block diagram form in order to facilitate describing one or more embodiments.

The term "mass block" used in the description of the following specific implementations may also be known as "balancing weight". These two terms mean a high-quality and high-density metal block that is secured to a vibrating block, which vibrates, to improve the vibration balance.

In addition, the present application is mainly applied to improvement of a micro vibrating motor, but application of the technology in the present application to a large vibrating motor will not be excluded. However, for convenience of description, the terms "linear vibrating motor" and "micro vibrating motor" have the same meaning in the following description of the embodiments.

In order to describe the structure of a linear vibrating motor of the present application in detail, the specific embodiments of the present application will be described in detail below with reference to the accompanying drawings.

To solve the problem of unbalanced vibration sense caused by unequal driving forces that are provided by a magnet of a vibrator and a stator coil in a conventional vibrating motor structure, in the linear vibrating motor provided by the present application, a magnetic induction block replaces the stator coil, such that the problem of unbalanced stress due to changes of an electrifying direction and an unstable magnitude of current of the stator coil is solved. A magnetic field of a push-pull structure is enhanced by a magnetic field produced by the vibrating block to realize reuse of a magnetic field of a driving portion of the linear vibrating motor. Besides, more space may be reserved for the design of an elastic support member.

Figure 1:
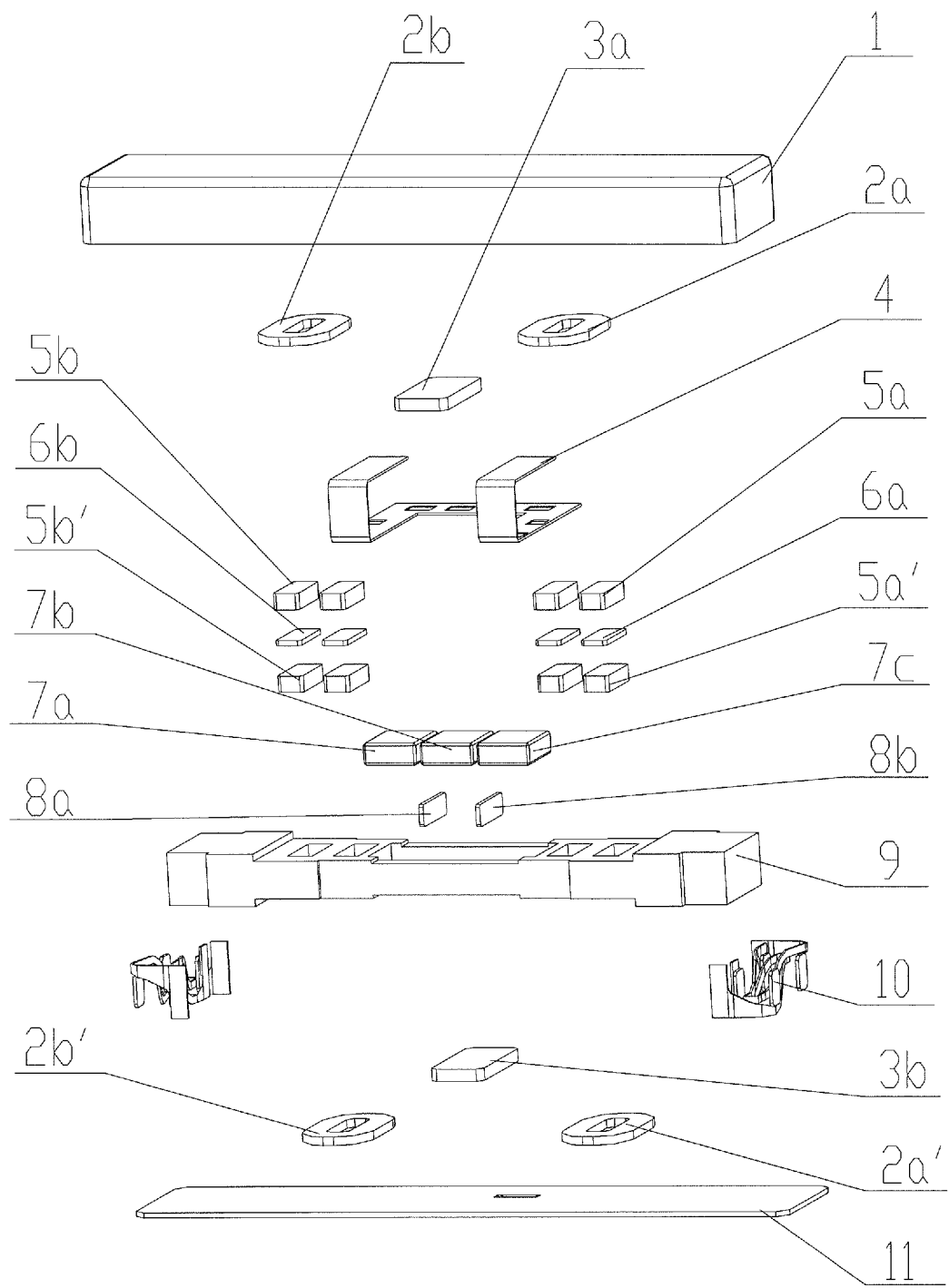
FIG. 1 is a breakdown structure schematic view of a linear vibrating motor according to an embodiment I of the present application.
Figure 2:
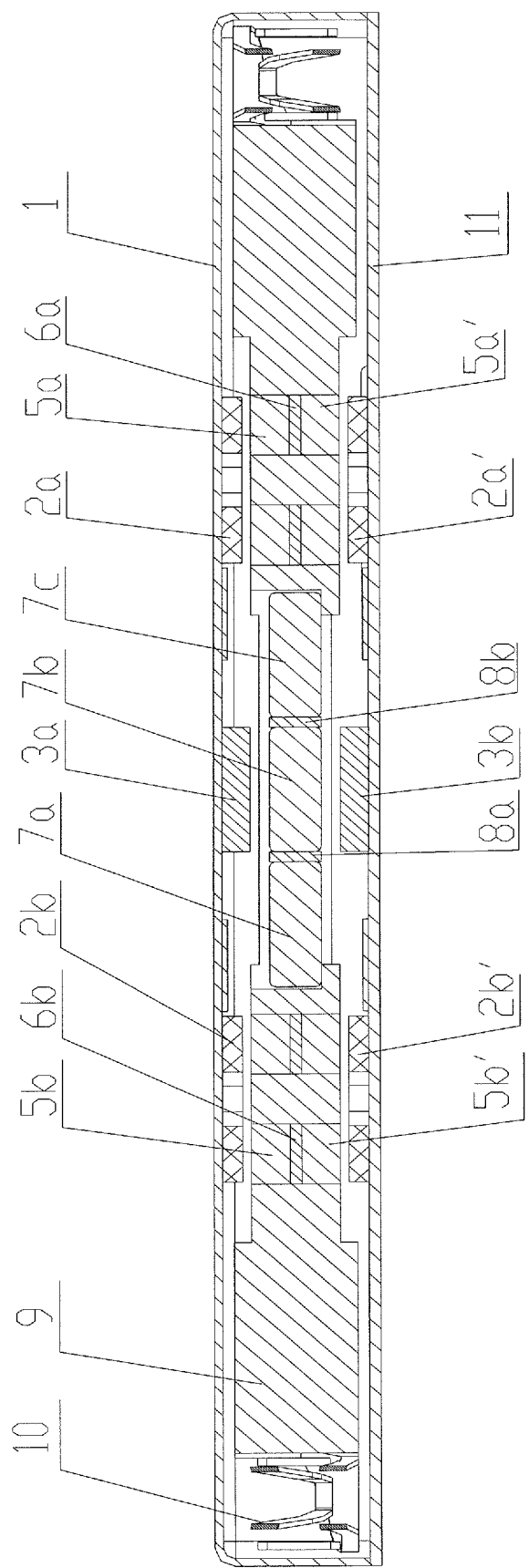
FIG. 2 is a sectional structure schematic view of the linear vibrating motor according to the embodiment I of the present application.
Figure 3A:
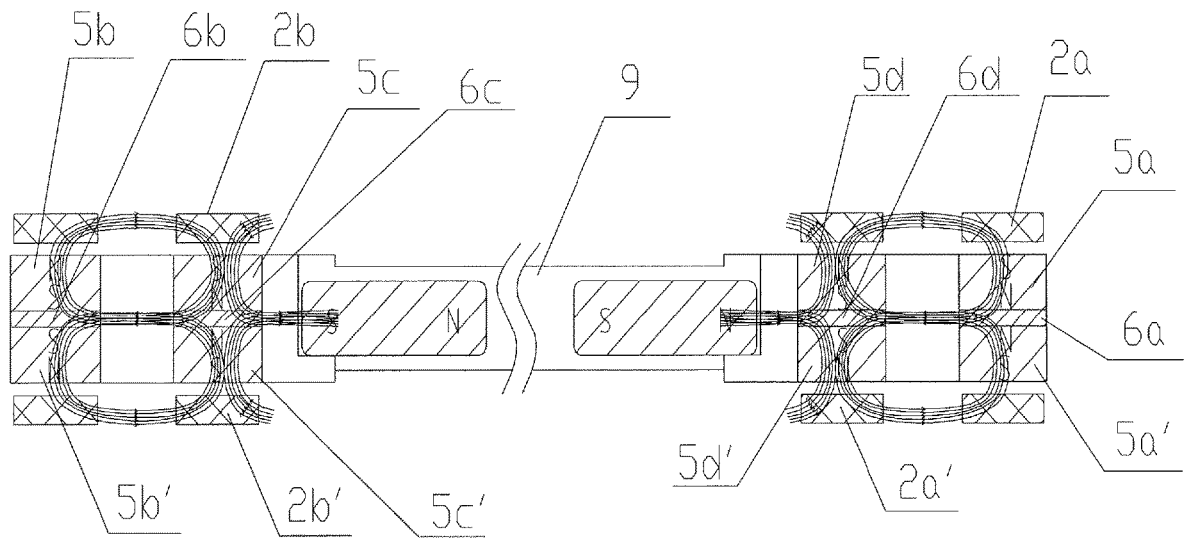
FIG. 3A is a principle schematic view I of the linear vibrating motor according to the embodiment I of the present application.

FIG. 1 illustrates a breakdown structure of a linear vibrating motor according to an embodiment I of the present application. FIG. 2 illustrates a sectional structure of the linear vibrating motor according to the embodiment I of the present application. FIG. 3A illustrates a principle of the linear vibrating motor according to the embodiment I of the present application.

As shown in FIGS. 1 to 3A, the linear vibrating motor according to the embodiment I of the present invention comprises a housing (including an upper housing 1 of a cuboid structure and a lower housing 11 that is connected and secured to the upper housing 1 in an adapting manner and adopts a platy structure), a vibrator and a stator. The stator is secured to the housing and is parallel to the vibrator. The vibrator comprises a mass block 9 and a vibrating block embedded in the middle of the mass block 9. The vibrating block comprises at least one permanent magnet. Push-pull structures adjoin two ends of the vibrating block respectively. The push-pull structure comprises a push-pull magnet embedded in the mass block and a push-pull coil secured to the housing, and provides a push-pull force for vibration of the vibrator under a cooperative action of the push-pull magnet and the push-pull coil. An interaction force for enhancing a magnetic field may be produced between the push-pull magnet and an adjacent permanent magnet. That is, a magnetic field produced by the permanent magnet may act on the push-pull structure, such that reuse of a magnetic field of a driving portion of the linear vibrating motor is realized.

Besides, as the push-pull structures adjoin the two ends of the vibrating block, more space may be reserved for the design of elastic support members located at two ends of the vibrating block. Thus, the structure is more reasonable. The push-pull coil generates a push-pull force in a horizontal direction together with the push-pull magnet after being electrified, such that an initial driving force is provided for a reciprocating motion of the vibrator along the direction that is parallel to the plane where the stator is located. Under the interaction of the magnetic field generated by the permanent magnet and the push-pull structure, the push-pull force may be enhanced. Accordingly, the vibration sense of the linear vibrating motor is improved.

Figure 3B:
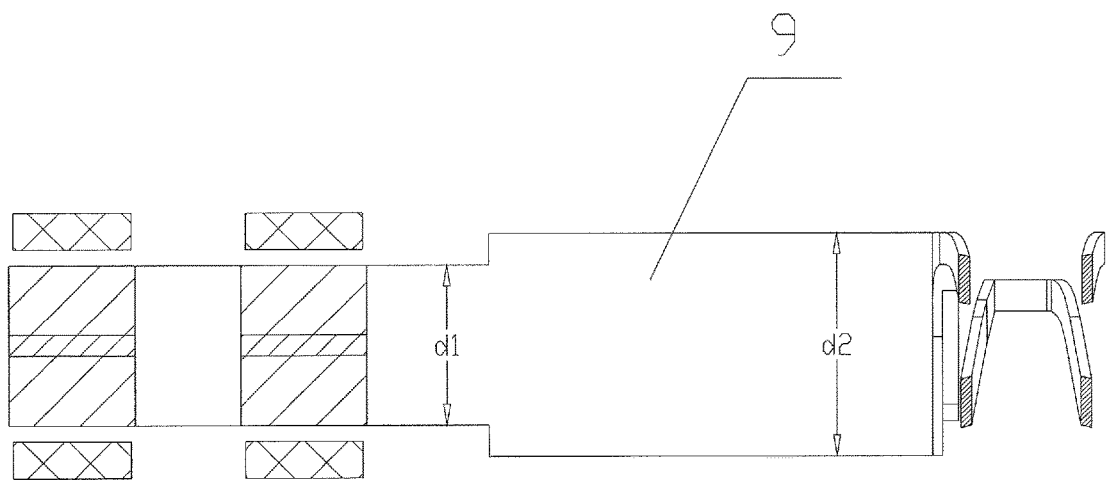
FIG. 3B is a principle schematic view II of the linear vibrating motor according to the embodiment I of the present application.

Particularly, FIG. 3B illustrates a principle II of the linear vibrating motor according to the embodiment I of the present application.

As shown in FIG. 3B, as the width d1 of the mass block is smaller than d2, the push-pull structures are disposed at two adjoining sides of the vibrating block, and the elastic support members are disposed at two ends of the mass block, enough space may be reserved for the design of the elastic support members. Besides, the interaction force between the magnetic field of the vibrating block and the push-pull coil may be realized. Reuse of the magnetic field generated by the permanent magnet is realized. The structure is more optimized. A vibration effect of the linear vibrating motor is more remarkable.

In a specified implementation of the present application, at least one pair of push-pull magnet securing grooves are symmetrically provided in the mass block. Each push-pull magnet securing groove accommodates two push-pull magnets that are distributed in the vertical direction and a magnetic induction yoke located between the two push-pull magnets. The push-pull magnets are magnetized in the vertical direction. The permanent magnet is magnetized in the horizontal direction. Adjacent ends of the permanent magnet and the adjacent push-pull magnet have opposite magnetic poles.

Particularly, as shown in FIGS. 1 to 3A, two pairs (four) push-pull magnet securing grooves are symmetrically provided in the mass block. That is, two push-pull magnet securing grooves are disposed at each of two sides of the vibrating block. Each push-pull magnet securing groove accommodates the two push-pull magnets that are distributed in the vertical direction. Four push-pull coils of which the positions correspond to those of the push-pull magnets are secured to the housing. The push-pull coil is located at the upper side and the lower side of the corresponding push-pull magnet. A winding direction of the push-pull coil is perpendicular to a magnetization direction of the push-pull magnet.

The push-pull magnets adjoining one side of the vibrating block comprise push-pull magnets 5a and 5a' that are located in the same push-pull magnet securing groove, as well as a magnetic induction yoke 6a located between the push-pull magnets 5a and 5a'. The push-pull magnets 5a and 5a' are distributed in the vertical direction. Abutting ends of the push-pull magnets 5a and 5a' have the same polarity. For example, if the magnetization direction of the push-pull magnet 5a is a vertical direction S-N, the magnetization direction of the push-pull magnet 5a' is a vertical direction N-S. Alternatively, if the magnetization direction of the push-pull magnet 5a is the vertical direction N-S, the magnetization direction of the push-pull magnet 5a' is the vertical direction S-N.

Besides, the push-pull magnets adjoining one side of the vibrating block further comprise push-pull magnets 5d and 5d', which are secured in the other push-pull magnet securing groove that is parallel to the push-pull magnet securing groove in which the push-pull magnets 5a and 5a' are located. The push-pull magnets 5a and 5a' are parallel to the push-pull magnets 5d and 5d'. The push-pull magnets 5d and the push-pull magnet 5a that are in the same horizontal direction have opposite magnetization directions. That is, the magnetization direction of the push-pull magnet 5d is a vertical direction N-S, and the magnetization direction of the push-pull magnet 5d' is a vertical direction S-N. Alternatively, the magnetization direction of the push-pull magnet 5d is the vertical direction S-N, and the magnetization direction of the push-pull magnet 5d' is the vertical direction N-S.

A push-pull coil 2a is disposed at the upper side of the push-pull magnets 5a and 5d, is secured to the housing and is parallel to the push-pull magnet. The winding direction of the push-pull coil 2a is perpendicular to the magnetization direction of the corresponding push-pull magnet. A push-pull coil 2a' is disposed at the lower side of the push-pull magnet 5a' and 5d', is secured to the housing and is parallel to the corresponding push-pull magnet. The winding direction of the push-pull coil 2a' is perpendicular to the magnetization direction of the corresponding push-pull magnet.

Similarly, the push-pull magnets adjoining the other side of the vibrating block comprise push-pull magnets 5b and 5b', a magnetic induction block 6b located between the push-pull magnets 5b and 5b', push-pull magnets 5c and 5c' and a magnetic induction block 6c located between the push-pull magnets 5c and 5c'. A push-pull coil 2b is disposed at the upper side of the push-pull magnets 5b and 5c. A push-pull coil 2b' is disposed at the lower side of the push-pull coils 5b' and 5c'. The magnetization directions and position structures of the push-pull magnets 5b, 5b', 5c and 5c' are similar to those of the push-pull magnets 5a, 5a', 5d and 5d', and will not be repeated herein.

It can be known that in a vibration process of the vibrating block, the interaction force for enhancing the magnetic field may be generated between the push-pull magnet and the adjacent permanent magnet. That is, the magnetic field generated by the permanent magnet may act on the push-pull structure, such that reuse of the magnetic field of the driving portion of the linear vibrating motor is realized and the push-pull force of the push-pull structure is enhanced.

In another specific implementation of the present application, the stator comprises magnetic induction blocks 3a and 3b which are secured to the housing. The magnetic induction blocks 3a and 3b are subject to two magnetic field forces in the same and/or opposite directions in the vibration direction of the vibrator. A resultant force of the two magnetic field forces is zero when the vibrator is in a balanced state. The direction of the resultant force of the two magnetic field forces is the same as that of relative displacement when the magnetic induction blocks 3a and 3b are displaced relative to the vibrator in the vibration direction of the vibrator under the action of the push-pull force, namely the initial driving force, generated by the push-pull structure. Besides, the magnitude of the resultant force of the two magnetic field forces and the relative displacement are in direct proportion.

The vibrating block comprises three permanent magnets which adjoin one another and are magnetized in the horizontal direction. Abutting ends of the adjoining permanent magnets have the same polarity. The magnetic induction blocks are of sheet structures, are disposed at the upper side and the lower side of the permanent magnet that is disposed in the middle of the central vibrating block, and are in central symmetry about the central vibrating block.

The central vibrating block comprises a first permanent magnet 7a, a second permanent magnet 7b and a third permanent magnet 7c which are disposed sequentially. A first magnetic induction yoke 8a is disposed between the first permanent magnet 7a and the second permanent magnet 7b. A second magnetic induction yoke 8b is disposed between the second permanent magnet 7b and the third permanent magnet 7c. A first magnetic induction block 3a is disposed at the upper side of the second permanent magnet 7b. A second magnetic induction block 3b is disposed at the lower side of the second permanent magnet 7b. The first magnetic induction block 3a and the second magnetic induction block 3b are secured to the housing. A certain gap is reserved between the first magnetic induction block 3a and the second permanent magnet 7b, as well as between the second magnetic induction block 3b and the second permanent magnet 7b. The first magnetic induction block 3a and the second magnetic induction block 3b are symmetrically distributed about the second permanent magnet 7b. The distances between the first magnetic induction block 3a and end parts of the first permanent magnet 7a and the third permanent magnet 7c, as well as between the second magnetic induction block 3b and end parts of the first permanent magnet 7a and the third peinianent magnet 7c, are the same when the vibrator is in a balanced still state.

It should be noted that the magnetic induction blocks may also be symmetrically or asymmetrically distributed at the upper side and the lower side of the vibrating block, and in the latter way, the magnetic induction blocks are disposed at one side of the vibrating block. For example, the vibrating block comprises three adjoining permanent magnets which are all magnetized in the horizontal direction. Abutting ends of the adjoining permanent magnets have the same polarity. There are two magnetic induction blocks that are symmetrically disposed at the upper side and the lower side of the vibrating block. The two magnetic induction blocks correspond to the permanent magnet in the middle of the vibrating block.

Alternatively, the vibrating block comprises one permanent magnet, and two magnetic induction blocks are disposed and located at the upper side or the lower side of the vibrating block. Alternatively, the two magnetic induction blocks are distributed corresponding to the left end and the right end of the permanent magnet and are symmetrical about a central axis of the permanent magnet.

Alternatively, the vibrating block comprises three adjoining permanent magnets which are all magnetized in the horizontal direction. The abutting ends of the adjoining permanent magnets have the same polarity. Six magnetic induction blocks are provided and symmetrically disposed at the upper sides and the lower sides of the three adjoining permanent magnets.

The vibrating block comprises three adjoining permanent magnets which are all magnetized in the horizontal direction. The abutting ends of the adjoining permanent magnets have the same polarity. Two magnetic induction blocks are provided and asymmetrically disposed at the upper side and the lower side of the vibrating block and are in central symmetry about the vibrating block.

The first magnetic induction block 3a is subject to two magnetic field forces F1 and F2 of which the magnitudes are the same and the directions are opposite when the vibrator is in a balanced state. The magnetic field force F1 borne by the first magnetic induction block 3a is smaller than F2 when the first magnetic induction block 3a is subject to a rightward relative displacement d to the vibrator in the vibration direction of the vibrator (including the permanent magnets 7a, 7b and 7c and the magnetic induction yokes 8a and 8b disposed between the adjoining permanent magnets). That is, a magnetic field force dF borne by the first magnetic induction block 3a has the formula $dF=F2-F1=Kd>0$ when the displacement (as the magnetic induction blocks are secured to the housing, this displacement is the relative displacement of the magnetic induction blocks to the permanent magnets) becomes d, wherein K is a coefficient of proportionality in which the magnetic induction block is subject to the magnetic field force, and K is related to the sizes of the magnetic induction blocks and the permanent magnets and the position of the magnetic induction blocks relative to the permanent magnets. Similarly, a magnetic field force dF borne by the second magnetic induction block 3b has the formula $dF=F4-F3=Kd>0$. Under the action of the first magnetic induction block 3a and the second magnetic induction block 3b, the vibrating block is driven to vibrate in a direction parallel to the magnetic induction blocks.

It can be known that the direction of the resultant force of the two magnetic field forces is the same as that of the relative displacement of the magnetic induction blocks when the magnetic induction blocks are displaced relative to the vibrator in the vibration direction of the vibrator. Besides, the magnitude of the resultant force of the two magnetic field forces and the relative displacement are in direct proportion. Thus, reverse rigidity change of the magnetic induction blocks is realized. The vibrator may generate resonance, and a vibration sense effect thereof is more remarkable.

Embodiment II

Figure 4A:
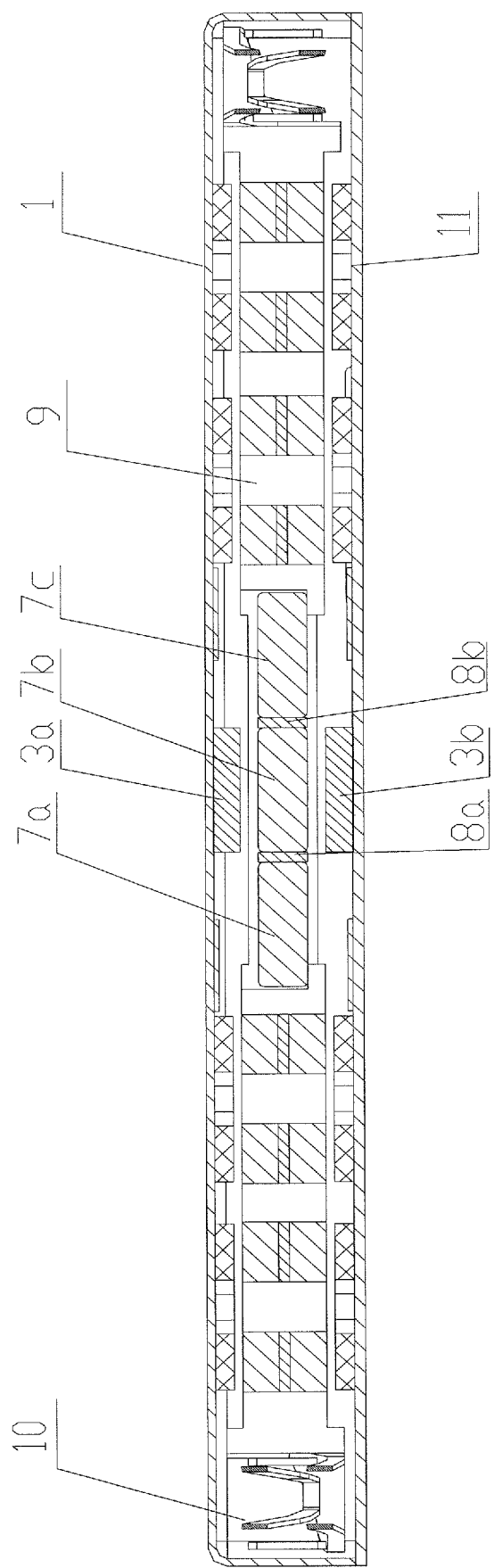
FIG. 4A is a sectional structure schematic view of a linear vibrating motor according to an embodiment II of the present application.
Figure 4B:
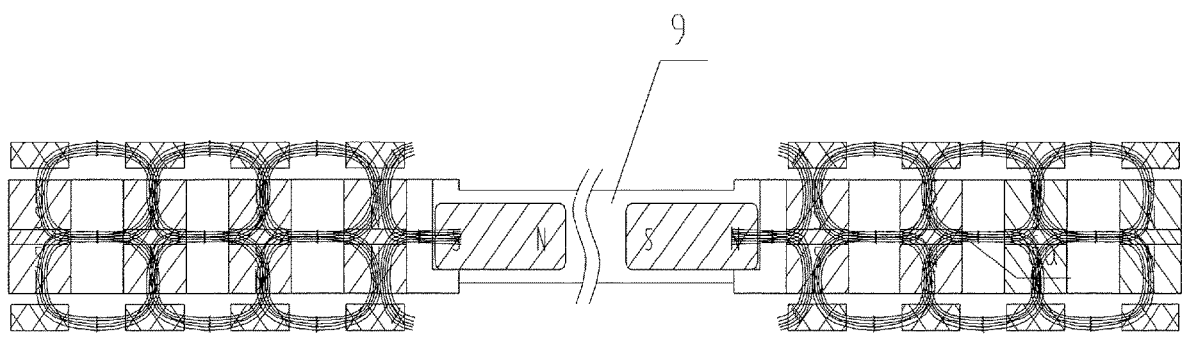
FIG. 4B is a principle schematic view of the linear vibrating motor according to the embodiment II of the present application.

FIG. 4A illustrates a sectional structure of a linear vibrating motor according to an embodiment II of the present application. FIG. 4B illustrates a principle structure of the linear vibrating motor according to the embodiment II of the present application.

As shown in FIG. 4A and FIG. 4B, in order to improve the magnetic induction strength of a push-pull structure and increase the vibration amplitude of a vibrator, the linear vibrating motor according to the embodiment II of the present application is provided with three groups (six) push-pull structure securing grooves adjoining a vibrating block, and two push-pull magnets and a magnetic induction yoke located between the two push-pull magnets are disposed in each push-pull structure securing groove.

The push-pull magnets are all magnetized in the vertical direction. Abutting ends of the adjoining push-pull magnets have the same polarity. Corresponding ends of the push-pull magnets in the same horizontal direction in the adjoining push-pull magnet securing grooves have opposite polarities.

In a specific application process of the present application, the number of groups of the push-pull magnets may be increased/reduced according to actual product requirements. For example, three or more groups of the push-pull magnets are adopted, and corresponding push-pull coils are disposed on every two groups or each group of the push-pull magnets, such that a push-pull force of the push-pull structure is enhanced, and the vibration sense of the linear vibrating motor is improved.

Embodiment III

Figure 5A:
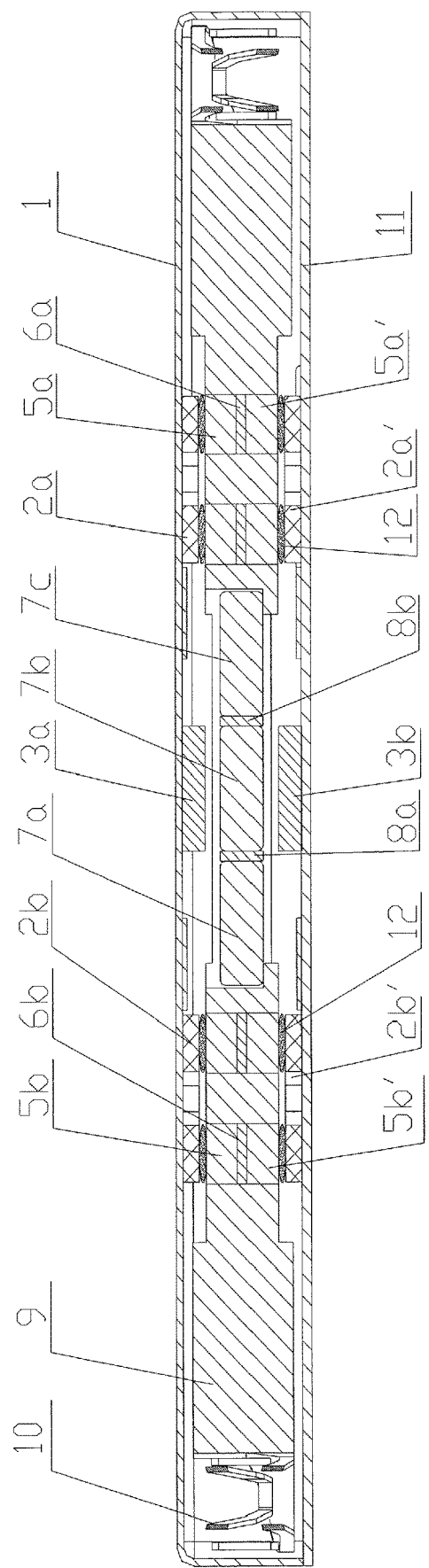
FIG. 5A is a sectional structure schematic view of a linear vibrating motor according to an embodiment III of the present application.
Figure 5B:
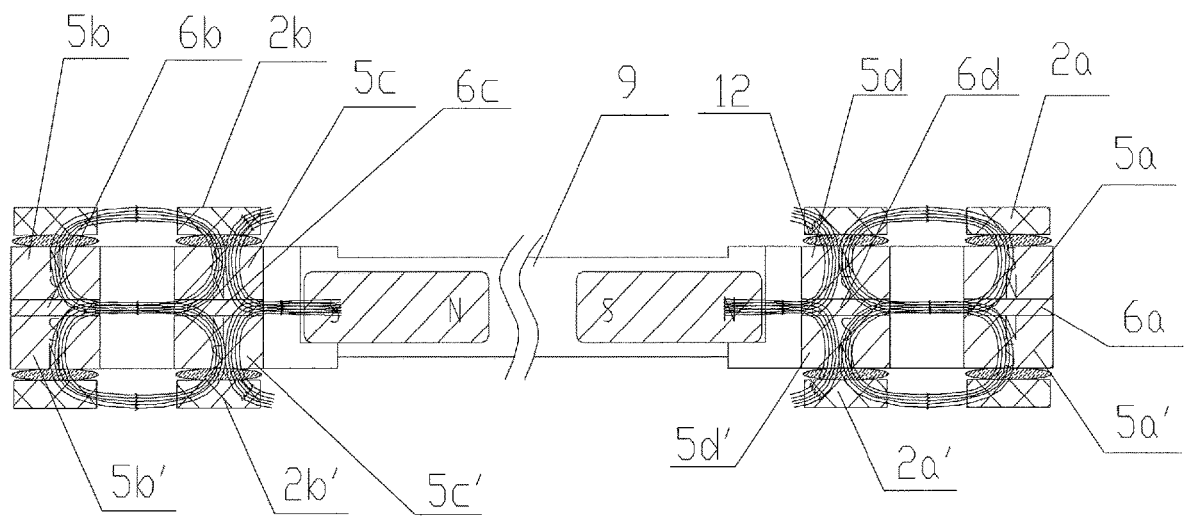
FIG. 5B is a principle schematic view of the linear vibrating motor according to the embodiment III of the present application.

FIG. 5A illustrates a sectional structure of a linear vibrating motor according to an embodiment III of the present application. FIG. 5B illustrates a principle of the linear vibrating motor according to the embodiment III of the present application.

As shown in FIG. 5A and FIG. 5B, in the linear vibrating motor according to the embodiment III of the present application, a magnetic liquid is filled between a push-pull coil and an adjacent push-pull magnet. A magnetic gap is formed between the push-pull magnet and the push-pull coil and filled with a flexible magnetic induction member which may be the magnetic liquid 12. The magnetic liquid 12 is a magnetic colloidal substance which mainly means a uniform and stable colloidal solution. The solution is formed by uniformly dispersing nano-sized magnetic particles (nickel, cobalt, iron oxide or the like), which are coated with a long-chain surfactant, in base fluids such as water, an organic solvent and oil.

During assembly, the push-pull structures may be firstly disposed in the corresponding push-pull structure securing grooves, and then the magnetic liquid is injected into the magnetic gap between the push-pull magnet and the push-pull coil. The magnetic liquid with a certain magnetism may be actively adsorbed onto the surface of the push-pull magnet, such that the strength of magnetic induction between the push-pull magnet and the push-pull coil may be enhanced by means of the magnetic liquid, and a stronger push-pull force is provided for the vibrating block.

Embodiment IV

Figure 6A:
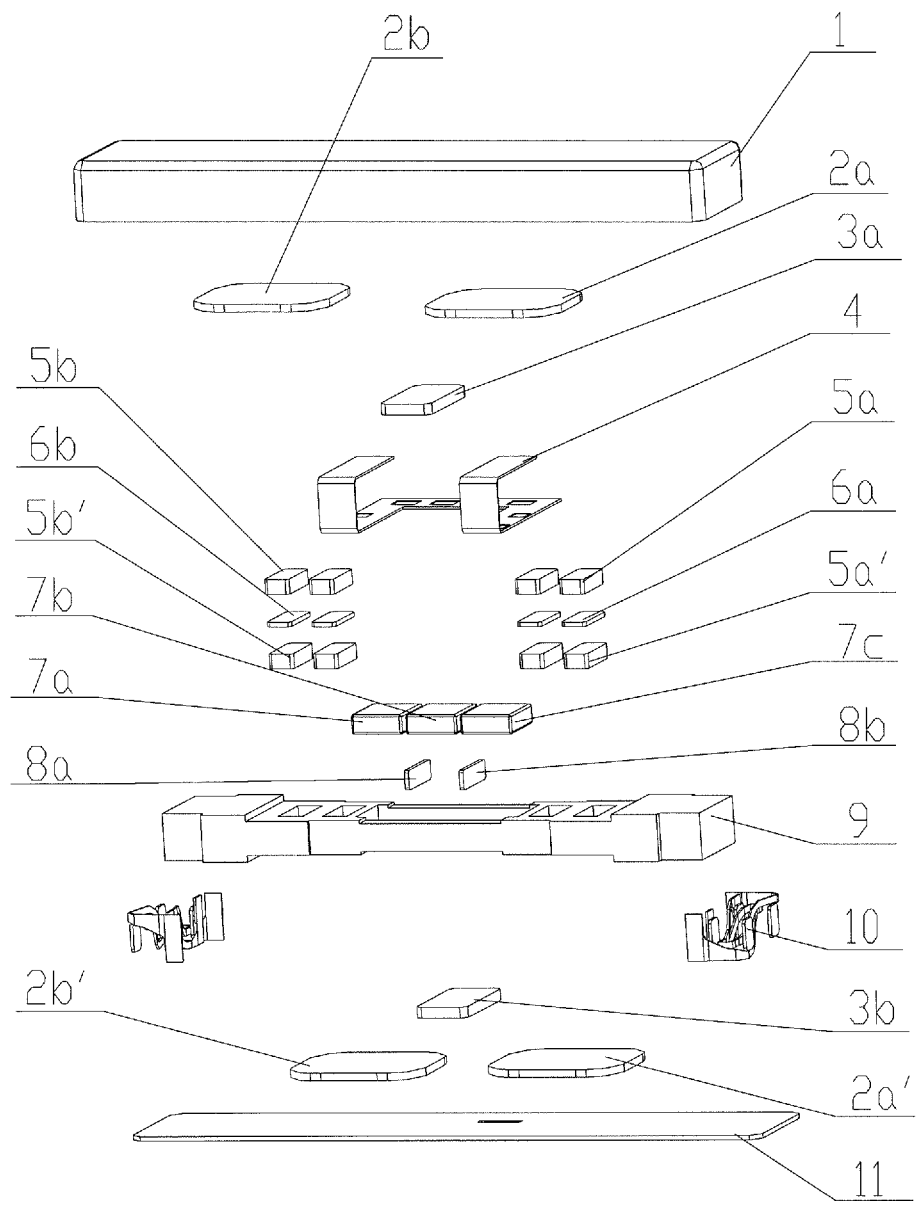
FIG. 6A is a breakdown structure schematic view of a linear vibrating motor according to an embodiment IV of the present application.
Figure 6B:
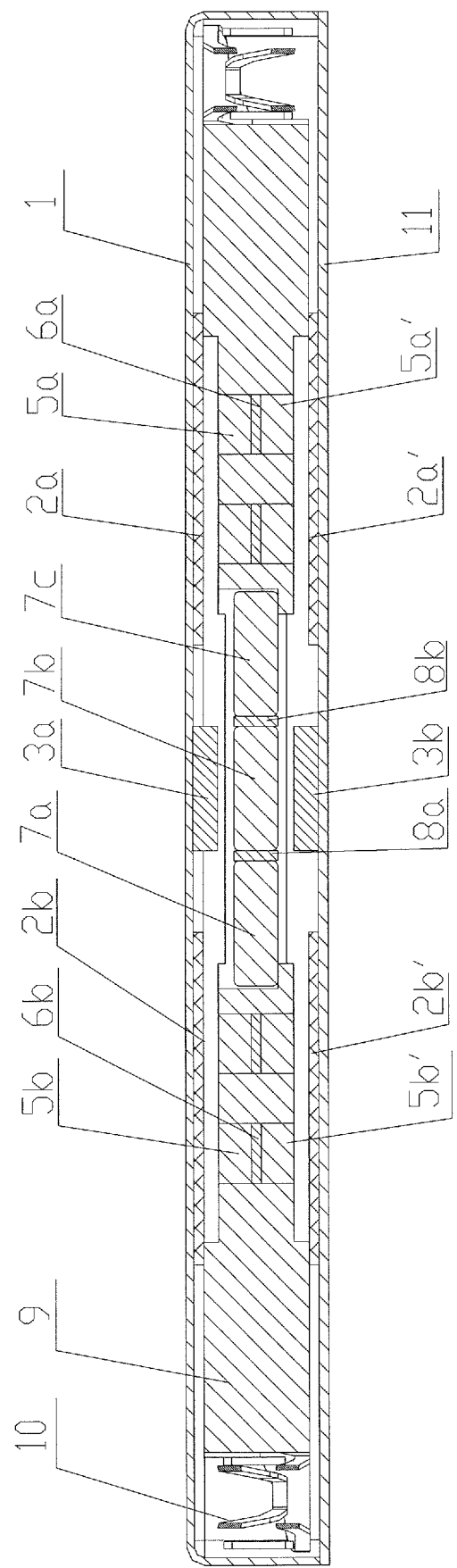
FIG. 6B is a sectional structure schematic view of the linear vibrating motor according to the embodiment IV of the present application.
Figure 6C:
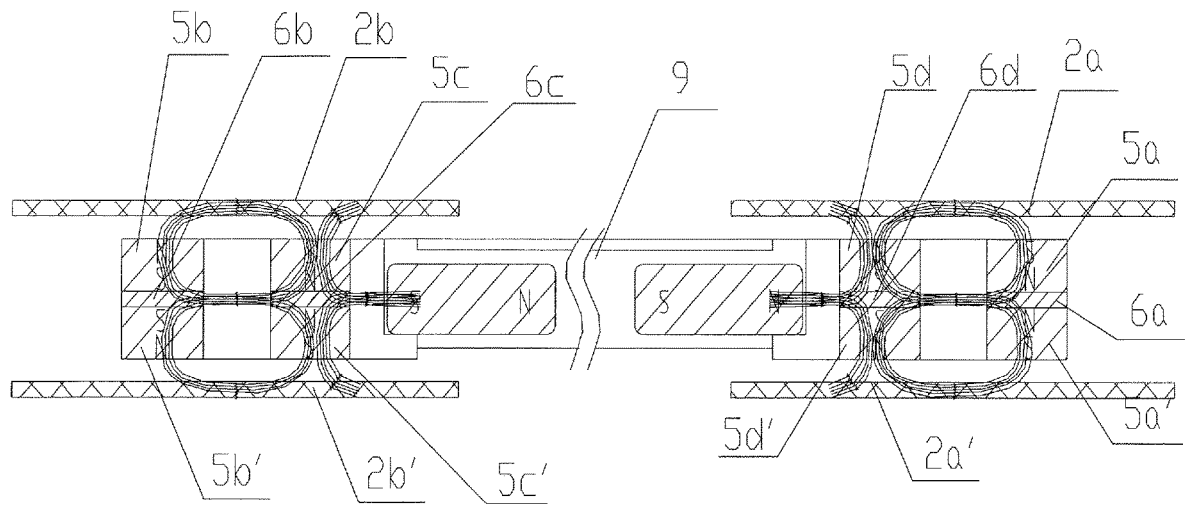
FIG. 6C is a principle schematic view of the linear vibrating motor according to the embodiment IV of the present application.

FIG. 6A and FIG. 6B illustrate a breakdown structure and a sectional structure of a linear vibrating motor according to an embodiment IV of the present application respectively. FIG. 6C illustrates a principle of the linear vibrating motor according to the embodiment IV of the present application.

Figure 6D:
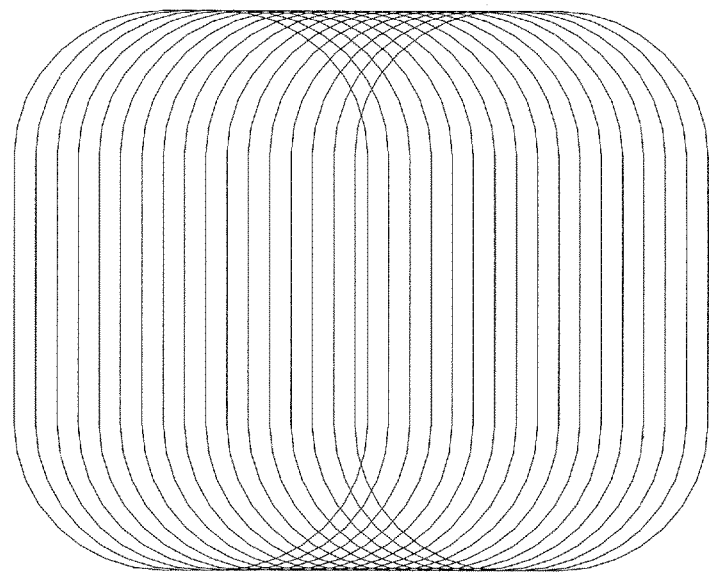
FIG. 6D is a schematic structural view of a push-pull coil of the linear vibrating motor according to the embodiment IV of the present application.

As shown in FIGS. 6A and 6C, in the linear vibrating motor according to the embodiment IV of the present application, a push-pull coil is an irregularly wound coil. The winding quantity of the push-pull coil in the position, with concentrated magnetic induction lines, of the push-pull magnet is increased. Particularly, the push-pull coil may be a superimposedly wound coil or a flat interleavingly wound coil (as shown in FIG. 6D).

In a winding process of the push-pull coil, the winding quantity in a unit area is increased by means of the superimposedly wound coil. Thus, an action force between the push-pull coil and the push-pull magnet is enhanced. In addition, in view of distribution of the magnetic field of the push-pull magnet, different magnetic induction intensities may be received in different positions of the push-pull coil. The push-pull coil may be designed into an irregularly wound coil. The winding quantity in the position, in which the magnetic field of the push-pull magnet is received in a centralized manner, of the push-pull coil is increased to increase the magnetic field utilization ratio of the push-pull magnet.

It should be noted that in the above specific implementations, a make-way structure corresponding to the push-pull coil and the magnetic induction block is disposed in the middle of the mass block. A groove for accommodating the vibrating block is provided in the mass block. The vibrating block is secured in the groove by means of gluing.

Moreover, the push-pull coils may be symmetrically disposed at one side or at the upper side and the lower side of the push-pull magnet. The structure of the push-pull magnet is not limited to the two structures as shown in the drawings. A group of push-pull magnets and push-pull coils corresponding to the push-pull magnets may be respectively disposed at two sides of the groove in which the vibrating block is secured, such that the initial driving force may be provided for the vibrator.

The linear vibrating motor provided by the present application further comprises a flexible printed circuit board (FPCB) 4 and an elastic support member 10. The FPCB is fixedly connected to the housing. The push-pull coil is communicated with an external circuit through a circuit on the FPCB. The elastic support members 10 are disposed at the left end and the right side of the mass block 9 respectively. The push-pull structure is disposed between the elastic support member 10 and the vibrating block. The elastic support member 9 is limited and secured between the vibrator and the housing to provide an elastic restoring force for vibration of the vibrator.

The vibrator moves to one end of the linear vibrating motor till the resultant force of the two magnetic field forces borne by the vibrator is smaller than an elastic force of the elastic support member at one end of the mass block when the magnetic induction block is displaced relative to the vibrator in the vibration direction of the magnetic induction block. After that, the vibrator moves in the opposite direction till the resultant force of the two magnetic field forces borne by the vibrator is smaller than an elastic force of the elastic support member at the other end of the mass block, such that reciprocating motion of the vibrator is realized.

The linear vibrating motor according to the present application is described above with reference to the accompanying drawing by examples. However, those skilled in the art should understand that various modifications may be made to the linear vibrating motor provided by the present application without departing from the basis of the present application. Thus, the scope of protection of the present application should be determined by the content of attached claims.

What is claimed is:

1. A linear vibrating motor, comprising a housing, a vibrator and a stator that is secured to the housing and is parallel to the vibrator, wherein the vibrator comprises a mass block and a vibrating block embedded in middle of the mass block, and the vibrating block includes a permanent magnet, and wherein
   push-pull structures adjoin two ends of the vibrating block;
   each push-pull structure comprises a push-pull magnet embedded in the mass block and a push-pull coil secured to the housing;
   an interaction force for enhancing a magnetic field is generated between the push-pull magnet and an adjacent permanent magnet; and
   the push-pull coil generates a push-pull force in a horizontal direction together with the push-pull magnet after being electrified to provide a push-pull force for a reciprocating motion of the vibrator in a direction that is parallel to a plane where the stator is located,
   wherein at least one pair of push-pull magnet securing grooves is symmetrically provided in the mass block, and
   wherein each push-pull magnet securing groove accommodates two push-pull magnets distributed in a vertical direction and a magnetic induction yoke located between the two push-pull magnets.

2. The linear vibrating motor according to claim 1, wherein
the stator comprises a magnetic induction block which is opposite to the vibrator and secured to the housing, and the magnetic induction block is subject to a magnetic field force that is the same as and/or opposite to a vibration direction of the vibrator.

3. The linear vibrating motor according to claim 2, wherein
when the vibrator is in a balanced state, a resultant force of a magnetic field force is zero; and
when the magnetic induction block is subject to a relative displacement with the vibrator in a vibration direction of the vibrator under an action of a push-pull force that is generated by the push-pull structure, a direction of a resultant force of the magnetic field force is the same as that of the relative displacement, and a magnitude of the resultant force of the magnetic field force and the relative displacement are in direct proportion.

4. The linear vibrating motor according to claim 2, wherein
a make-way structure that corresponds to the push-pull coil and the magnetic induction block is disposed in the middle of the mass block;
a groove for accommodating the vibrating block is provided in the mass block; and
the vibrating block is secured in the groove by means of gluing.

5. The linear vibrating motor according to claim 1, wherein
the push-pull magnet is magnetized in the vertical direction, the permanent magnet is magnetized in the horizontal direction, and adjacent ends of the permanent magnet and an adjacent push-pull magnet have opposite magnetic poles.

6. The linear vibrating motor according to claim 1, wherein
four pairs of push-pull magnet securing grooves are symmetrically provided in the mass block, and each push-pull magnet securing groove accommodates two push-pull magnets that are distributed in the vertical direction;
four push-pull coils, positions of the four push-pull coils corresponding to positions of the push-pull magnets, are secured to the housing; and
the push-pull coils are located at upper and lower sides of the corresponding push-pull magnets, and a winding direction of each push-pull coil is perpendicular to a magnetization direction of the corresponding push-pull magnet.

7. The linear vibrating motor according to claim 1, wherein a magnetic liquid is filled between the push-pull coil and an adjacent push-pull magnet.

8. The linear vibrating motor according to claim 1, wherein
the push-pull coil is an irregularly-wound coil, and a winding quantity of the push-pull coil in a position, with concentrated magnetic induction lines, of the push-pull magnet is increased.

9. The linear vibrating motor according to claim 1, wherein the push-pull coil is a superimposedly wound coil or an interleavingly wound coil.

10. The linear vibrating motor according to claim 1, wherein when the vibrator is in a balanced state, a resultant force of a magnetic field force is zero; and
when a magnetic induction block is subject to a relative displacement with the vibrator in a vibration direction of the vibrator under an action of a push-pull force that is generated by the push-pull structure, a direction of a resultant force of the magnetic field force is the same as that of the relative displacement, and a magnitude of the resultant force of the magnetic field force and the relative displacement are in direct proportion.

11. The linear vibrating motor according to claim 1, wherein
a make-way structure that corresponds to the push-pull coil and a magnetic induction block is disposed in the middle of the mass block;
a groove for accommodating the vibrating block is provided in the mass block; and
the vibrating block is secured in the groove by means of gluing.

* * * * *